United States Patent [19]

Pettijohn

[11] Patent Number: 5,350,816

[45] Date of Patent: Sep. 27, 1994

[54] OLEFIN POLYMERIZATION PROCESS AND POLYMER PRODUCED

[75] Inventor: Ted M. Pettijohn, Bartlesville, Okla.

[73] Assignee: Phillips Petroleum Company, Bartlesville, Okla.

[21] Appl. No.: 99,042

[22] Filed: Jul. 29, 1993

Related U.S. Application Data

[62] Division of Ser. No. 955,606, Oct. 1, 1992, Pat. No. 5,260,244, which is a division of Ser. No. 810,581, Dec. 19, 1991, Pat. No. 5,182,244.

[51] Int. Cl.$^5$ .............................................. C08F 4/44
[52] U.S. Cl. .................................. 526/114; 526/113; 526/352; 502/110
[58] Field of Search ........................ 526/113, 114, 352

[56] References Cited

U.S. PATENT DOCUMENTS

| | | | |
|---|---|---|---|
| 4,530,914 | 7/1985 | Ewen et al. | 502/113 |
| 4,575,538 | 3/1986 | Hsieh et al. | 502/102 X |
| 4,668,773 | 5/1987 | Marks et al. | 502/152 X |
| 4,701,432 | 10/1987 | Welburn, Jr. | 502/113 |
| 4,801,666 | 1/1989 | Marks et al. | 526/123 |
| 4,939,217 | 7/1990 | Stricklen | 502/113 X |
| 5,028,673 | 7/1991 | Pettijohn et al. | 526/159 |
| 5,066,739 | 11/1991 | Pettijohn et al. | 526/127 |
| 5,109,085 | 4/1992 | Pettijohn et al. | 526/160 |
| 5,110,884 | 5/1992 | Pettijohn et al. | 526/114 |

OTHER PUBLICATIONS

"Pentamethylcyclopentadienyl Derivatives of the Trivalent Lanthanide Elements Neodymium, Samarium, and Ytterbium", T. Don Tilley and Richard Andersen, Inorg. Chem. vol. 20, pp. 3267–3270, 1981 (No month available).

Primary Examiner—Joseph L. Schofer
Assistant Examiner—David Wu
Attorney, Agent, or Firm—Marianne H. Michel

[57] ABSTRACT

A polymerization catalyst system is formed by combining an organometal compound and a transition metal compound to produce a catalyst A; and combining catalyst A and a catalyst B comprising a rare earth complex having a formula $Cp_nMX_{4-n} \cdot M'L_x$, wherein Cp is cyclopentadienyl or cyclopentadienyl substituted with an alkyl or alkyl silyl radical, M is yttrium, scandium or a rare earth metal having an atomic number in the range of 57 to 71, M' is an alkali metal, L is a suitable electron donor ligand, X is a halogen, n is 1 or 2, and x is a number corresponding to the value needed to form a stable complex.

Optionally catalyst A is contacted with a rare earth metal halide.

Optionally catalyst B is contacted with an alkali or alkaline earth metal alkyl.

Optionally a hydrocarbyl aluminum compound can be contacted with catalyst B or with the catalyst system.

14 Claims, 1 Drawing Sheet

OLEFIN POLYMERIZATION PROCESS AND POLYMER PRODUCED

This application is a divisional of copending application Ser. No. 07/955,606, filed Oct. 1, 1992 now U.S. Pat. No. 5,260,244, which is a division of application Ser. No. 07/810,581, Dec. 19, 1991, U.S. Pat. No. 5,182,244.

Field of the Invention

The present invention relates to the polymerization of olefins and to a rare earth metal catalyst suitable for use in that process.

BACKGROUND OF THE INVENTION

It is well known that olefins such as ethylene, propylene and 1-butene can be polymerized in the presence of certain metallic catalysts, particularly the reaction products of organometallic compounds and transition metal compounds, to form substantially linear polymers of relatively high molecular weight. Typically such polymerizations are carried out at relatively low temperatures and pressures. The catalysts thus described produce polymers of narrow molecular weight distribution.

For many applications, such as extrusion and molding processes, it is highly desirable to have polymers which have a broad molecular weight distribution of the unimodal or the multimodal type. Such polymers exhibit excellent processability, i.e., they can be processed at a faster throughput rate with lower energy requirements with reduced melt flow perturbations.

It is also known to use certain organolanthanide compounds as olefin polymerization catalysts. Ballard et al in *J.C.S. Chem. Comm.*, (1978) pages 994 and 995 reported that certain alkyl bridged complexes of lanthanide metals such as $[(CH_5H_5)_2ErCH_3]_2$ and $[C_5H_4R)_2YCH_3[_2$, would polymerize ethylene. Marks and Mauermann in their U.S. Pat. No. 4,668,773 disclose that an ethylene polymerization catalyst could be obtained by reacting a pentamethylcyclopentadienyl lanthanide halide ether complex with a special type of lithium alkyl and then reacting that product with hydrogen to yield a catalyst of the general $[(C_5Me_5)_3LnH]_2$. The dimeric hydrido complex of Marks et al was reported to have activities as high as 3,000 grams of polyethylene per millimole neodymium, however, the data also indicates that the catalyst had a very short lifetime (on the order of seconds to minutes). The overall productivity of the catalyst was thus quite low. The synthesis of Marks catalyst system was also very complex. It was a multi-step procedure that had to be carried out under rigorously anaerobic conditions. The procedure also requires the use of exotic organolithium compounds which contain no beta hydrogen or beta alkyl groups.

SUMMARY OF THE INVENTION

An object of the present invention is to provide a simple process to prepare a high activity catalyst system useful for the polymerization of olefins.

It is another object of the invention to provide a method for the polymerization of olefins to produce polymers with improved processability.

In accordance with the present invention, a catalyst system is produced by combining a catalyst A comprising, an organometal compound and a transition metal compound and optionally a metal halide selected from the group consisting of yttrium, scandium, and rare earth metal halides having atomic numbers 57–71 inclusive; and a catalyst B comprising a rare earth complex having a formula $Cp_nMX_{4-n} \cdot M'L_x$ and optionally an alkali or alkaline earth metal alkyl, wherein Cp is cyclopentadienyl or cyclopentadienyl substituted with an alkyl or alkyl silyl radical, M is selected from yttrium, scandium and rare earth metals having an atomic number in the range of 57 to 71, M' is an alkali metal, L is a suitable electron donor ligand, X is a halogen, n is 1 or 2, and x is a number in the range of 1 and 3 corresponding to the value needed to form a stable complex.

In a particularly preferred embodiment, the polymerization is conducted in the presence of hydrogen.

BRIEF DESCRIPTION OF THE DRAWINGS

The drawings are a graphic representation of the results obtained in the examples.

DETAILED DESCRIPTION OF THE INVENTION

Figure 1:
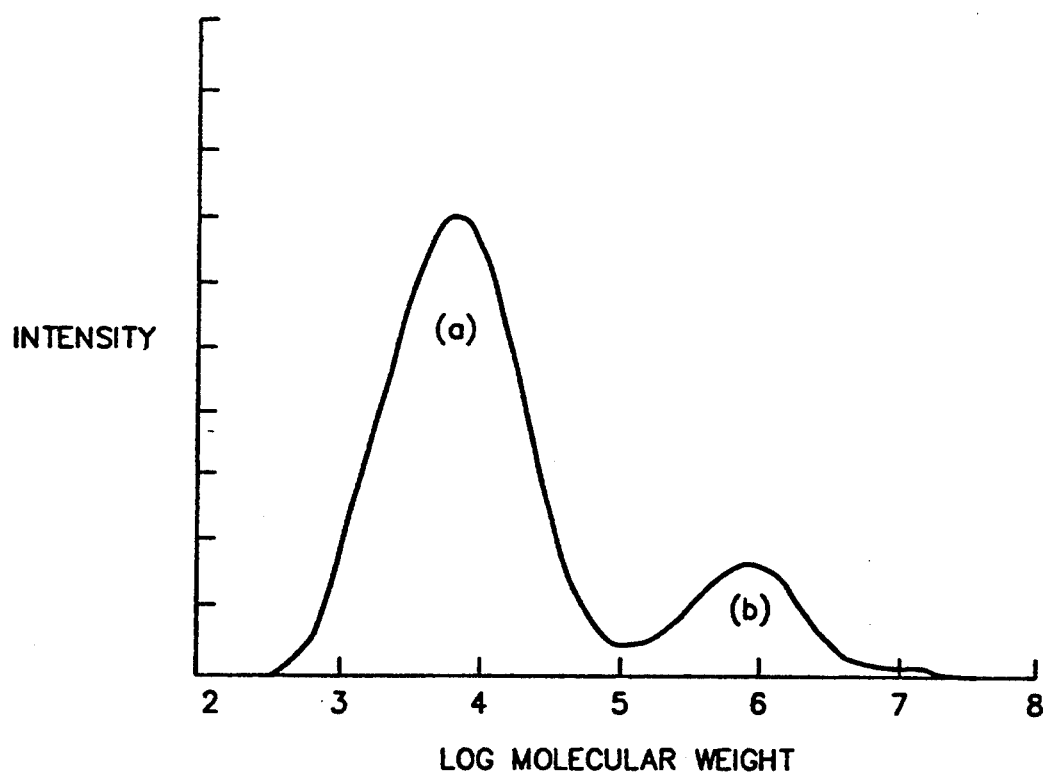

The inventive catalyst system is produced by combining a catalyst A, comprising an organometal compound and a transition metal compound and optionally a metal halide selected from the group consisting of yttrium, scandium, and rare earth metal halides having atomic numbers 57–71 inclusive; and a catalyst B, comprising a rare earth complex having a formula $Cp_nMX_{4-n} \cdot M'L_x$ and optionally an alkali or alkaline earth metal alkyl. In a particularly preferred embodiment, the polymerization is conducted in the presence of hydrogen. In the presence of hydrogen, catalyst A produces high molecular weight polymer. The molecular weight of the polymer produced by catalyst B can be controlled by the addition of hydrogen. Resin produced by combining catalyst A and catalyst B exhibits a desirable broad or bimodal molecular weight distribution.

Catalyst A

The organometal compound used in catalyst A can be a compound selected from an element of Groups IA, IIA, IIB, and IIIA of the Mendeleev Periodic Table. As used herein by the term "Mendeleev Periodic Table" is meant the periodic Table of the Elements as shown in the inside front cover of Perry, Chemical Engineer's Handbook, 4th Edition, McGraw Hill & Co. (1963). Some typical examples of such compounds include lithium alkyls, Grignard reagents, dialkylmagnesium compounds, dialkylzinc compounds, and organoaluminum compounds.

Alkali or alkaline earth metal alkyls are preferred. Generally the alkyl radicals would contain 1 to 12 carbon atoms. Some specific examples of such metal alkyls include n-butyl sodium, n-butyl lithium, secondary butyl lithium, tertiary butyl lithium, n-butyl potassium, diethyl magnesium, and di-n-butyl magnesium. Currently, lithium and magnesium alkyls are preferred due to availability and effectiveness. Generally a lithium or magnesium alkyl having 2 to 6 carbon atoms per alkyl group would be used. The currently preferred alkyls are dibutyl magnesium and the butyl lithiums, with n-butyl lithium being most preferred butyl lithium.

The transition metal compound used in catalyst A, can be selected from compounds of the formula $MX_4$, wherein M is zirconlure, hafnium and titanium and each X is individually selected from the group consisting of halogen, alkyl, alkoxy, and aryl radicals. Preferably the hydrocarbyl groups on the metal compound have 1 to 6 carbon atoms. Some typical examples of such compounds include dicyclopentadienyl zirconium dichloride, dicyclopentadienyl hafnium dichloride, dicyclopentadienyl titanium dichloride, titanium tetrachloride, titanium tetrabromide, titanium tetraiodide, monomethoxytrichlorotitanium, dimethoxy dichlorotitanium, trimethoxy monochloro titanium, tetramethoxy titanium, tetraethoxy titanium, triethoxy monochloro titanium, mono isopropoxy trichloro titanium, and monophenoxytrichlorotitanium. Titanium tetrahalides are preferred with titanium tetrachloride being most preferred.

The relative amounts of organometal compound to transition metal compound can vary over a relatively broad range; however, for optimum results the moles of organometal per mole of transition metal would be in the range of about 0.1 to about 100, preferably in the range of about 1 to about 50, and most preferably in the range of 1 to 10.

The contacting of the organometal compound and the transition metal compound can be carried out in a suitable diluent. The diluent can be any normally liquid material that does not interfere with the polymerization activity of the catalyst system. Typical diluents would include hydrocarbons. Typical examples of such hydrocarbons include pentane, heptane, hexane, cyclohexane, octane, benzene, xylene, and toluene.

The contacting of the organometal compound and the transition metal compound can be carried out at any suitable temperature. Generally, they would be contacted in a suitable diluent at a temperature in the range of about $-50°$ C. to about $200°$ C., preferably from about $0°$ C. to about $125°$ C., and most preferably in the range of $15°$ C. to $110°$ C. The contacting is preferably done under an inert atmoshpere and the catalyst is preferably used soon after preparation.

The pressure employed in contacting the organometal compound and the transition metal compound can vary over a wide range, generally being in the range of about 0 to about 5000 psig, preferably in the range of about 0 to about 1500 psig, and most preferably in the range of 0 to 750 psig.

Generally the time of reaction can vary broadly up to about 1 day, preferably from 1 second to 5 hours, and most preferably from 1 second to 1 hour.

In a preferred embodiment, catalyst A is prepared by contacting a metal halide selected from the group consisting of yttrium, scandium, and rare earth metal halides having atomic numbers 57-71 inclusive, an organometal compound, and a transition metal compound.

The metal halides employed in catalyst A, comprise yttrium, scandium and rare earth elements starting with lanthanum (atomic number 57) and ending with lutetium (atomic number 71) of the Mendeleev Periodic Table.

The metals are generally in the +3 oxidation state and in substantially anhydrous form. Some typical examples of metal halides that are contemplated for use in this invention include neodymium trichloride, cerous triiodide, lanthanum tribromide, lanthanum trichloride, lanthanum triiodide, cerous trichloride, praseodymium tribromide, praseodymium trichloride, neodymium tribromide, neodymium triiodide, promethium trichloride, samarium tribromide, samarium trichloride, europium trichloride, gadolinium tribromide, gadolinium trichloride, terbium trichloride, dysprosium trichloride, holmium trichloride, thulium trichloride, ytterbrium trichloride, lutetium trichloride, lanthanum oxybromide, lanthanum oxychloride, cerous oxychloride, ceric oxychloride, neodymium oxychloride, and neodymium oxybromide. Generally the rare earth chlorides are preferred because of availability, neodimium trichloride is especially preferred.

It is also within the scope of the present invention to employ such halides in combination with rare earth metal oxides. Some examples of such rare earth metal oxides include cerous oxide, neodymium oxide, lanthanum oxide. Mixtures of two or more rare earth metal halides or of various rare earth metal halides and rare earth metal oxides can be employed. Some typical examples of such mixtures include $NdCl_3$ with $Nd_2O_3$ and $NdGl_3$ with $CeO_2$.

In preparing catalyst A employing the optional metal halide of the inventive catalyst system, it is preferred to first contact the organometal compound and the metal halide. The contacting can be done in a suitable liquid diluent. The thus defined contacting produces a reaction mixture. The diluent can be any normally liquid material that does not interfere with the polymerization activity of the catalyst system. Typical diluents would include hydrocarbons. Typical examples of such hydrocarbons include pentane, heptane, hexane, cyclohexane, octane, benzene, xylene, and toluene.

Generally, the organometal compound and the metal halide would be contacted in a suitable diluent at a temperature in the range of about $-50°$ C. to about $22°$ C., preferably in the range of about $0°$ C. to $125°$ C., and most preferably in the range of $15°$ C. to $110°$ C. The contacting is preferably done under an inert atmosphere.

The pressure employed in contacting the organometal and the metal halide can vary over a wide range, generally being in the range of about 0 to about 1000 psig, preferably in the range of about 0 to about 200 psig, and most preferably in the range of 0 to 50 psig.

The time of reaction can vary broadly up to about 1 month, preferably up to about 1 week, and most preferably from 1 minute to 2 days.

The relative amounts of organometal compound to metal halide can vary over a relatively broad range; however, for optimum results the moles of organometal per mole of metal halide would be in the range of about 0.1 to about 100, preferably in the range of 1 to about 50, and most preferably in the range of 1 to 10.

After the organometal compound and the metal halide have been contacted to form the reaction mixture, the transition metal compound and the reaction mixture are contacted to produce catalyst A. Formation of catalyst A would preferably be conducted under an inert atmosphere. The resulting catalyst would then preferably be used in polymerization soon after preparation.

The contacting of the reaction mixture and the transition metal compound can be carried out at any suitable temperature. Generally, they would be contacted in the suitable diluent at a temperature in the range of about $-50°$ C. to about $200°$ C., preferably in the range of about $0°$ C. to $125°$ C., and most preferably in the range of $15°$ C. to $110°$ C. The contacting is preferably done under an inert atmosphere and the catalyst is preferably used soon after preparation.

The pressure employed can vary over a wide range, generally being in the range of about 0 to about 5000 psig, preferably in the range of about 0 to about 1500 psig, and most preferably in the range of 0 to 750 psig.

The time of contacting can vary broadly from about 1 second to about 1 day, preferably from 1 second to about 5 hours, and most preferably from 1 second to 1 hour.

The relative amounts of metal halide to transition metal can vary over a relatively broad range; however, for optimum results the moles of metal halide per mole of transition metal would be in the range of about 0.1 to about 100, preferably in the range of about 1 to about 50, and most preferably in the range of 1 to 30.

Catalyst B

The rare earth complexes used in catalyst B are cyclopentadienyl rare earth complexes selected from compounds of the formula $Cp_nMX_{4-n} \cdot M'L_x$, wherein Cp is cyclopentadienyl or cyclopentadienyl substituted with an alkyl or alkyl silyl radical, M is yttrium, scandium or a rare earth metal having an atomic number in the range of 57 to 71, M' is an alkali metal, L is a suitable electron donor ligand, X is a halogen, n is 1 or 2, and x is a number in the range of 1 and 3 corresponding to the value needed to form a stable complex.

Some specific examples of the Cp groups include cyclopentadienyl, ethyl cyclopentadienyl, trimethylcyclopentadienyl, trimethylsilylcyclopentadienyl, and pentamethylcyclopentadienyl. Generally, the substituents of the substituted cyclopentadienyl would each have 1 to 4 carbon atoms. Currently pentamethylcyclopentadienyl is preferred.

The halogens, X, of the above formula are preferably chloride or iodide. Chloride is the most preferred.

Preferably M is selected from the group consisting of ytterbium, neodymium, lutecium, and samarium, with neodymium being the most preferred. Generally M' would be selected from lithium, sodium and potassium, with lithium being the most preferred.

The L of the above formula can be selected from any suitable electron donor ligand. Some specific examples of electron donor ligands include tetrahydrofuran (THF), diethyl ether, and N,N,N,',N',-tetramethylethylene diamine (tmed).

Some specific examples of such rare earth complexes include:

$(Me_5C_5)_2YbCl_2 \cdot Li(Et_2O)_2$,
$(C_5H_4SiCH_3Ph_2)_2YbCl_2 \cdot Li(Et_2O)_2$,
$[C_5H_4Si(CH_3)_2]_2YbCl_2 \cdot Li(Et_2O)_2$,
$(Me_5C_5)_2 NdCl_2 \cdot Li(Et_2O)_2$,
$(Me_5C_5)YbCl_3 \cdot Li(THF)$,
$(Me_5C_5)_2LuCl_2 \cdot Li(Et_2O)_2$,
$Me_5C_5)LuCl_3 \cdot Li(Et_2O)$,
$(Me_5C_5)_2YbI_2 \cdot Li(Et_2O)_2$,
$(Me_5C_5)YBI_3 \cdot Li(Et_2O)_2$,
$(Me_5C_5)_2YbCl_2 \cdot Li(THF)_{2-3}$,
$(Me_5C_5)_2YbCl_2 \cdot Li(tmed)$,
$(Me_5C_5)_2SmCl_2 \cdot Li(tmed)$,
$(Me_5C_5)_2NdCl_2 \cdot Li(tmed)$,
$(Me_5C_5)_2YbCl_2 \cdot Na(Et_2O)_2$,
$(Me_5C_5)NdCl_2 \cdot Na(Et_2O)_2$, and
$(Me_5C_5)_2NdCl_2 \cdot Na(Et_2O)$.
Currently
$(Me_5C_5)_2NdCl_2 \cdot Li(Et_2O)_2$ is preferred.

The rare earth complexes can be prepared using techniques known in the art. In view of the fact that rare earth metals in general are extremely air and moisture sensitive, all manipulations are preferably conducted under anaerobic conditions using standard Schlenk techniques.

The rare earth complex can be activated with a metal alkyl. Any suitable alkali or alkaline earth metal alkyl can be employed as activating agent. In some cases, catalyst A will contain an alkali or alkaline earth metal alkyl in an amount sufficient to activate the rare earth complex of catalyst B. In such cases catalyst A can be used to activate catalyst B. Generally alkyllithiums and alkyl magnesiums are preferred. Generally the alkyl radicals of the metal alkyl would contain 1 to 12 carbon atoms. Some specific examples of such metal alkyls include n-butyl sodium, n-butyl lithium, secondary butyl lithium, tertiary butyl lithium, n-butyl potassium, diethyl magnesium, and di-n-butyl magnesium. Dibutyl magnesium and n-butyl lithium are especially preferred.

The ratio of metal alkyl as activating agent to rare earth complex can vary over a wide range depending upon the particular compounds employed and the particular results desired. As a general rule, the moles of metal alkyl per mole of metal in the rare earth complex will be in the range of from about 0.1 to about 500, preferably in the range of from about 0.5 to about 300, and most preferably in the range of 1 to 100.

In one preferred embodiment of the present invention, the polymerization is carried in the additional presence of a hydrocarbyl aluminum compound of the formula $R_nAlZ_{3-n}$, where Z is hydrogen or halogen and R is an alkyl group, and n is 1 to 3. Examples include triethylaluminum, ethylaluminum dichloride, and diethyl aluminum chloride. The preferred hydrocarbyl aluminum compounds are alkyl aluminum hydrides, for example, diethyl aluminum hydride, di-n-butyl aluminum hydride, di-isobutyl aluminum hydride, and dimethyl aluminum hydride. Diethyl aluminum hydride is most preferred.

The hydrocarblyl aluminum compound can be contacted with catalyst B or with the catalyst system as a cocatalyst.

The ratio of hydrocarbyl aluminum compound to titanium can vary over a wide range depending upon the particular compounds employed and the particular results desired. As a general rule, the moles of hydrocarbyl aluminum compound per mole of transition metal will be in the range of from about 1 to about 1000, preferably in the range of from about 1 to about 500, and most preferably in the range of 1 to 200.

The contacting of the hydrocarbyl aluminum compound and catalyst B can be carried out at any suitable temperature. Generally, they would be contacted in a suitable diluent at a temperature in the range of about −50° C. to about 200° C., preferably from about 0° C. to about 125° C., and most preferably in the range of 15° C. to 110° C. The contacting is preferably done under an inert atmoshpere and the catalyst is preferably used soon after preparation.

The pressure employed in contacting the hydrocarbyl aluminum compound and catalyst B can vary over a wide range, generally being in the range of about 0 to about 1000 psig, preferably in the range of about 0 to about 200 psig, and most preferably in the range of 0 to 50 psig.

Generally the time of reaction can vary broadly from about 1 second to about 1 day, preferably from 1 second to 5 hours, and most preferably from 1 second to 1 hour.

Reactants

It is considered that the catalyst system produced when catalyst A is used in combination with catalyst B, and optionally a cocatalyst, is suitable for the polymerization of any olefin that is polymerizable with a so-called Zeigler-Natta type polymerization catalyst. Typical polymerizable olefins include the aliphatic monolefins having 2 to 18 carbon atoms. The term polymerization is used herein to include both homo- and co-polymerization. In copolymerization other polymerizable monomers can be employed with the olefins, such as conjugated and nonconjugated dienes.

Examples of such olefins include ethylene, propylene, 4-methyl-1-pentene, butene-1, styrene, allyl trimethylsilane, and hexene-1. Copolymerization of two or more alpha olefins or of an alpha olefin and a diane is contemplated. Examples of typical dienes include 1,3-butadiene, trans-1,3-pentadiene, 1,4-hexadiene, 1,5-hexadiene, trans-1,3-hexadiene, 2,3-dimethyl-1,3-butadiene, trans-3-methyl-1,3-pentadiene, 2,3-dimethyl-1,3-butadiene, trans-trans-2,4-hexadiene, ethyldiennorbornene, dicyclopentadiene and mixtures containing 2 or more polymerizable unsaturated hydrocarbons.

A particular group of olefins to be polymerized according to the invention includes unsaturated hydrocarbons having 2 to 6 carbon atoms and having at least one polymerizable ethylenic double bond. The present invention is particularly effective in polymerizing ethylene homopolymers and copolymers which contain at least 90 mole percent, and preferably at least 95 mole percent ethylene. In one especially preferred embodiment 99 to 99.6 mole percent ethylene is used and 0.4 to 1 mole per cent of a 4 to 10 carbon atom comonomer is used; in this embodiment hexene is a particularly desirable comonomer because of cost, availability and efficacy.

The polymerizations can be carried out in either a solution or a slurry type process. Conventional polymerization diluents can be used in combination with the catalyst system. Some typical examples of such diluents include aromatic and aliphatic hydrocarbons such as toluene, xylene, hexane, isobutane, heptane, ethyl benzene, decylene, cyclohexane, and mineral spirits.

The polymerization reaction can be carried out in the presence of molecular hydrogen to regulate the molecular weight of the olefin polymers, as known in the art. Hydrogen, when employed, can vary over a wide range, again depending upon the particular compounds employed as the catalyst and the particular results desired. Typically, the hydrogen would be employed at a pressure in the range of from about 10 to about 200 psi, more preferably about 15 to about 100 psi.

Polymerization Conditions

The inventive catalyst system can be used to polymerize olefins using the same type of conditions often used in the polymerizations using the so-called Ziegler-Natta catalysts. The best results have been noted when the polymerization is conducted under an ethylene partial pressure of at least 100 psig, still more preferably at least about 500 psig. Preferably ethylene partial pressures of 100–1000 psi are used. Higher reaction pressures, such as 5000 to 10,000 could be employed, but the additional expense of the required equipment generally outweighs the benefits obtained. The polymerization can be also be carried out in gas phase in the absence of solvent or diluent.

The catalyst system of this invention, that is the catalyst A and catalyst B, can be employed in a batchwise, semi-continuous, or in a continuous polymerization process. Generally, the present polymerization reaction can be carried out at a temperature in the range of about 0° C. to about 200° C., preferably a temperature of about 25° C. to about 150° C., and most preferably from 25° C. to 100° C. Polymerization pressure can vary depending on the type of monomer, the catalyst activity, the desired degree of polymerization, etc. Polymerization pressure can be subatmospheric or superatmospheric pressure up to about 300 atmospheres, preferably from atmospheric pressure up to about 100 atmospheres, and most preferably from atmospheric pressure up to 50 atmospheres.

Contacting time for the catalyst and the olefins can vary broadly, generally from about 1 minute up to about one week, more preferably from about 1 minute up to about 24 hours, and most preferably from 5 minutes up to 5 hours.

Generally, when using a solvent or diluent in the instant polymerization reaction, it is convenient to introduce olefin into a dispersion containing the catalyst system of the present invention in the solvent or diluent. The catalyst composition can be added in its whole amount to the polymerization system at the start or it can be added portion-wise over the period for the polymerization.

In a batch process of polymerizing ethylene, for example, a stirred autoclave is conditioned by purging with dry nitrogen and then with the hydrocarbon diluent that is to be employed in the polymerization process such as isobutane, for example. After closing the port, hydrogen, if used, is added, and the hydrocarbon diluent is then charged.

The reactor is then heated to the desired reaction temperature, e.g. about 50° to about 120° C., the ethylene is admitted and maintained at a partial pressure within a range of about 0.5 to about 5.0 MPa (70–725 psig). At the end of the reaction period, generally about 1 hour for bench scale testing, the polymerization reaction can be terminated by venting unreacted olefin and diluent. The reactor is then opened and the free-flowing white ethylene polymer can be collected, dried, and weighed.

In a continuous process, for example, a suitable reactor such as a loop reactor is continuously charged with suitable quantities of solvent or diluent, catalyst, cocatalyst, olefin, and hydrogen, if used. The contact between the catalyst system and monomer can be effected by various ways. For example, the olefin can be contacted with the catalyst in the form of a fixed bed, a slurry, a fluid bed, or a movable bed.

Products

The reactor product is continuously or intermittently withdrawn, and the polymer recovered, e.g. flashing diluent and unreacted olefin and drying the product. In order to recover a produced polymer from the polymerization system, the crude polymerization product can be for example taken up and subjected to flash separation, solvent extraction, hot filtration under a pressure, or centrifugal separation to yield a substantially pure polymeric product. A selection of the polymerization conditions for the process of the present invention, as well as the method for the recovery and purification of the polymeric product will be understood by those skilled in the art from the conventional low or modest pressure polymerization processes for olefins.

The following examples will serve to show the present invention in detail by way of illustration and not by way of limitation.

EXAMPLES

In carrying out the experiments set forth in the following examples, the reagents were of the highest purity available. Common solvents were degassed and then either dried by storage over molecular sieves or over active metal followed by distillation under reduced pressure. The catalysts were prepared in an argon atmosphere drybox by weighing the anhydrous solids into a small pressure tube. The tube was sealed using a perforated crown cap over a self-sealing gasket that had been extracted with toluene. Outside the box, solvent and other reagents were added via a syringe.

Catalyst A of the inventive catalyst system, except as noted otherwise, was prepared as follows: anhydrous $NdCl_3$, in the amount of 0.25 grams (1 mmole) was weighed into a 25 milliliter pressure tube. The solid was then suspended in 5 milliliters of toluene and 1,2 mL of n-butyl lithium in the form of a 2.5 molar solution in hexane (3.0 millimoles) was added. The mixture was placed on a continuous shaker and agitated for a period of 16 hours. At the end of the reaction time, a dark brown solution with a brown-black solid resulted. Then 11 microliters of titanium tetrachloride (0.1 mmole) was added to the reaction mixture. A dark brown solid formed immediately. The mixture was shaken to homogenize it as much as possible and an aliquot of the catalyst solution was charged to the polymerization reactor no more than about 3 minutes after the addition of the titanium tetrachloride.

Catalyst B, $(Me_5C_5)_2NdCl_2.Li(Et_2O)_2$, except as noted otherwise, was prepared as disclosed by T. D. Tilley and R. A. Andersen, *Inorganic Chemistry*, Vol. 20, No. 10, p 3269, 1981. Lithium pentamethylcyclopentadienide (0.037 mol) was added to neodymium trichloride (0.018 mol), and tetrahydrofuran (225 mL) was added. The suspension was refluxed for 12 hours. The tetrahydrofuran was removed under vacuum, and the residue was extracted with diethyl ether (2×100 mL), concentrated, and cooled (−10° C.). The light blue needles were collected and dried under vacuum.

Example I

In the following runs, the polymerization reactions were carried out in a one-liter stirred autoclave. All reactions, unless otherwise indicated, were run under the following conditions. Prior to the reactions, the autoclave was washed thoroughly with dry cyclohexane and purged with nitrogen. 500 milliliters of cyclohexane was added to the reactor and the temperature maintained at 50° C. Then an aliquot of the catalyst solution was charged under a counterflow of ethylene through a small port. The reactor was sealed and the ethylene pressure increased. At the end of the reaction, the solvent and ethylene were rapidly vented and the solid polymer was collected and dried. Some polymerizations were conducted in the presence of varying amounts of hydrogen. In the following examples the catalyst activity is set forth as grams PE/gram Nd/h or grams PE/gram Ti/h. It should be noted that the activities specified are scaled to one hour based upon the results obtained for the actual time of polymerizations.

The results using catalyst A, are summarized in Table 1. The results using catalyst B, comprising the complex $(Me_5C_5)_2NdCl_2.Li(Et_2O)_2$ as catalyst, and various metal alkyls are summarized in Table 2. Table 3 summarizes the results using the inventive catalyst A and catalyst B combination.

In the inventive catalyst A and catalyst B combination, $10[NdCl_3.3n-BuLi]/TiCl_4$ catalyst (0.02 mmol Ti) was charged to the reactor first. A solution of $(Me_5C_5)_2NdCl_2.Li(Et_2O)_2$ (0.036 mmol Nd) was then added. The reactor was sealed under slight $H_2$ pressure (ca. 2 psig). Ethylene was added and a pressure of 525 psig was maintained for 30 minutes at 50° C.

$H_2$ is the partial pressure of hydrogen, $\Delta P(H_2)$, as psig.

MI is melt index, g/10 minutes, ASTM D1238-65T, conditions E.

HLMI is high load melt index, g/10 minutes, ASTM D1238-65T, condition F.

SR is shear response and is the ratio of HLMI/MI.

Density is g/mL.

HI is heterogeneity index and is the ratio of $M_w/M_n$.

$M_w$ is the weight average molecular weight.

$M_n$ is the number average molecular weight.

$Cp_2.Nd$ is the $(Me_5C_5)_2NdCl_2.Li(Et_2O)_2$ complex.

BuLi and n-BuLi are normal-butyl lithium.

s-BuLi is secondary-butyl lithium.

t-BuLi is tertiary-butyl lithium $Bu_2Mg$ is dibutyl magnesium.

DEAH is diethylaluminum hydride.

TEA is triethylaluminum.

TABLE 1

| Catalyst | $H_2$ psig | gPE/gTi/h | HLMI |
|---|---|---|---|
| 30 nBuLi/TiCl$_4$ | 0 | 42,000 | 0 |
| 30 nBuLi/TiCl$_4$ | 20 | 24,000 | 0.030 |
| 10[NdCl$_3$.3nBuLi]/TiCl$_4$ | 0 | 93,000 | 0 |
| 10[NdCl$_3$.3nBuLi]/TiCl$_4$ | 20 | 36,000 | 0.015 |

TABLE 2

| Cp$_2$.Nd (mmol) | R$_n$M | M/Nd | H$_2$ (psig) | Time (°C.) | Activity gPE/gNd/h | MI | HLMI | Density (g/mL) |
|---|---|---|---|---|---|---|---|---|
| 0.047 | n-BuLi | 1 | — | 5 | 20,000 | 0 | 0.26 | 0.9485 |
| 0.041 | s-BuLi | 1 | — | 5 | 24,000 | 0 | 0.51 | 0.9452 |
| 0.039 | t-BuLi | 1 | — | 5 | 7,600 | — | — | — |
| 0.089 | n-BuLi | 1 | 20 | 5 | 44,000 | 690 | — | 0.9758 |
| 0.006 | Bu$_2$Mg | 96 | — | 30 | 36,000 | 0.14 | 5.00 | 0.9513 |
| 0.022 | n-BuLi/DEAH (1:1) | 2 | — | 15 | 41,000 | 0 | 0.09 | 0.9386 |

TABLE 3

| Run | Cp$_2$.Nd mmol | NdCl$_3$ mmol | Ti mmol | BuLi mmol | Time min. | Polymer Yield | MI | Mw/1000 | HI |
|---|---|---|---|---|---|---|---|---|---|
| 1 | 0.036 | 0.2 | 0.02 | 0.6 | 30 | 35.68 g | 27 | 177 | 37.5 |
| 2 | 0.033 | 0 | 0 | 0.6 | 30 | 29.50 g | 436 | 40 | 9.2 |

TABLE 3-continued

| Run | Cp$_2$.Nd mmol | NdCl$_3$ mmol | Ti mmol | BuLi mmol | Time min. | Polymer Yield | MI | Mw/ 1000 | HI |
|---|---|---|---|---|---|---|---|---|---|
| 3 | 0 | 0.2 | 0.02 | 0.6 | 30 | 27.05 g | 0 | — | — |

Figure 2:
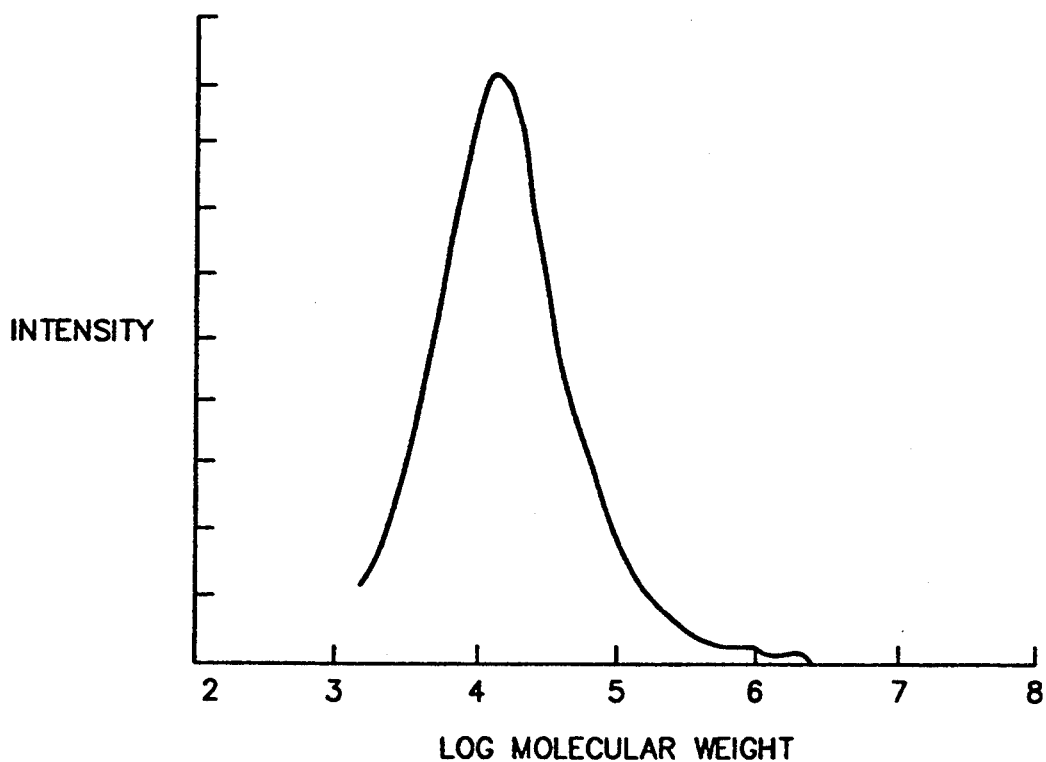

Table 3, Run 1 demonstrates that two catalysts can be combined in the presence of olefin under polymerization conditions to produce a polymer having broad or bimodal molecular weight distribution. Tables 1, 2, and 3 demonstrate each component of the catalyst system used independently. Table 1 and Table 3, Run 3, correspond to catalyst A alone. Table 2 and Table 3, Run 2, show catalyst B alone. FIG. 1, which corresponds to Table 3, Run 1, shows the gel permeation chromatography (GPC) trace of the resin produced using the inventive catalyst combination. FIG. 1 clearly shows a well separated bimodal molecular weight distribution. The lower molecular weight fraction corresponds to that produced by the (Me$_5$C$_5$)$_2$NdCl$_2$Li(OEt$_2$)$_2$.nBuLi/H$_2$ catalyst and the higher molecular weight fraction corresponds to the heterogeneous Ziegler-Natta catalyst. FIG. 2 contains a typical GPC trace of the polymer produced using catalyst B and shows a polymer having narrow molecular weight distribution.

Example 2

A series of polymerizations were run using TEA as cocatalyst. The polymerizations were carried out at 50° C. 550 psig and for a period of 30 minutes. TEA was charged to the reactor before the other catalyst components. In Run 1, TEA (0.6 mmol) was charged to the reactor followed by a mixture of (Me$_5$C$_5$)$_2$NdCl$_2$Li(OEt$_2$)$_2$ (0.006 mmol) and 5 mL toluene, n-BuLi (0.006 mmol), and finally TiCl$_4$ (0.006 mmol). H$_2$ was not present in Run 1. All parameters in Run 2 were the same as run 1 with the exception of the presence of 2 psig H$_2$. In Run 3 TEA (0.6 mmol) was charged to the reactor, followed by a mixture of TiCl$_4$ and n-BuLi (0.003 mmol), and finally a mixture of (Me$_5$C$_5$)$_2$NdCl$_2$Li(OEt$_2$)$_2$ (0.03 mmol) and n-BuLi (0.03 mmol). The mole ratio of Nd, Li, and Al to Ti is represented in the table. Activity is represented as g PE/g Nd/h.

TABLE 4

| Run | Order of Catalyst Addition | H$_2$ | Polymer Yield |
|---|---|---|---|
| 1 | TEA—Cp$_2$Nd/BuLi/TiCl$_4$ | 0 | 10.54 g |
| 2 | TEA—Cp$_2$Nd/BuLi/TiCl$_4$ | 2 | 1.17 g |
| 3 | TEA—(BuLi/TiCl$_4$)(Cp$_2$Nd/BuLi) | 2 | 1.16 g |

That which is claimed is:

1. A polymerization process comprising contacting at least one alpha-olefin monomer under polymerization conditions with a catalyst system comprising:
   (1) a catalyst A comprising an organometal compound and a transition metal compound,
   wherein said organometal compound is selected from the group consisting of alkali metal alkyls and alkaline earth metal alkyls and mixtures thereof, and
   wherein said transition metal compound is selected from the group consisting of compounds having the formula TiX$_4$, wherein each X is individually selected from the group consisting of halogen, alkyl, alkoxy, and aryl radicals; and
   (2) a catalyst B comprising a rare earth complex having a formula Cp$_n$MX$_{4-n}$.M'L$_x$, wherein Cp is cyclopentadienyl or cyclopentadienyl substituted with an alkyl or alkyl silyl radical, M is yttrium, scandium or a rare earth metal having an atomic number in the range of 57 to 71, M' is an alkali metal, L is a suitable electron donor ligand, X is a halogen, n is 1 or 2, and x is a number corresponding to the value needed to form a stable complex.

2. A process according to claim 1 wherein said polymerization conditions comprise a temperature of about 0° to about 200° C. and a pressure up to 300 atmospheres.

3. A process according to claim 1 wherein said catalyst A further comprises a metal halide selected from the group consisting of yttrium, scandium, and rare earth metal halides having atomic numbers 57–71 inclusive.

4. A process according to claim 1 wherein said catalyst B further comprises a metal alkyl selected from the group consisting of alkali metal alkyls, alkaline earth metal alkyls, and mixtures thereof.

5. A process according to claim 1 wherein said catalyst B further comprises a hydrocarbyl aluminum compound.

6. A process according to claim 1 wherein said organometal compound in catalyst A is selected from the group consisting of lithium alkyls and magnesium alkyls containing 2 to 6 carbon atoms.

7. A process according to claim 1 wherein said transition metal compound in catalyst A is a titanium tetrahalide.

8. A process according to claim 1 wherein Cp in catalyst B is pentamethylcyclopentadienyl;
   wherein M is selected from the group consisting of neodymium, samarium, and ytterbium;
   wherein M' is selected from from the group consisting of lithium, sodium, and potassium; and
   wherein L is selected from the group consisting of tetrahydrofuran, diethylether, and N,N,N',N'-tetramethylethylene diamine.

9. A process according to claim 3 wherein said metal halide in catalyst A is selected from the halides of neodymium, praseodymium, lanthanum, yttrium, and mixtures thereof.

10. A process according to claim 4 wherein said metal alkyl in catalyst B is selected from the group consisting of alkyl lithium and alkyl magnesium.

11. A polymerization process comprising contacting at least one alpha-olefin monomer under polymerization conditions with a catalyst system comprising:
   (1) a catalyst A comprising neodymium trichloride, n-butyl lithium, and titanium tetrachloride;
   (2) a catalyst B comprising (Me$_5$C$_5$)NdCl$_2$.Li(Et$_2$O)$_2$ and a metal alkyl selected from the group consisting of butyl lithium, dibutyl magnesium, diethylaluminum hydride, and mixtures thereof.

12. A process according to claim 11 wherein said alpha-olefin monomer comprises ethylene.

13. A process according to claim 11 wherein said polymerization conditions comprise a temperature of 25° C. to 100° C. and a pressure of atmospheric up to 50 atmospheres.

14. A process according to claim 11 wherein said polymerization is conducted in the presence of hydrogen in an amount sufficient to control the molecular weight distribution of the polymer.

* * * * *